(12) United States Patent
Hozumi et al.

(10) Patent No.: US 6,240,256 B1
(45) Date of Patent: May 29, 2001

(54) EXPOSURE COMPENSATION DEVICE FOR AN AUTO EXPOSURE CAMERA

(75) Inventors: Toshiaki Hozumi, Tokyo; Hidehiro Ogawa, Funahashi, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/347,923

(22) Filed: Jul. 6, 1999

Related U.S. Application Data (63) Continuation of application No. 08/887,294, filed on Jul. 2, 1997, now abandoned, which is a continuation of application No. 08/497,083, filed on Jun. 30, 1995, now abandoned.

(30) Foreign Application Priority Data

Sep. 7, 1994 (JP) .................................................. 6-213626

(51) Int. Cl.$^7$ ........................................................ G03B 7/08
(52) U.S. Cl. ......................... 396/223; 396/238; 396/299
(58) Field of Search ................................. 396/213, 238, 396/239, 242, 243, 244, 287, 292, 299, 223, 297

(56) References Cited

U.S. PATENT DOCUMENTS

| | | | |
|---|---|---|---|
| 4,455,068 | * 6/1984 | Izuhara | 396/242 |
| 4,688,922 | 8/1987 | Furuya et al. | 356/442 |
| 4,814,812 | 3/1989 | Nakajima et al. | 354/412 |
| 4,985,723 | 1/1991 | Egawa et al. | 354/442 |
| 5,005,047 | 4/1991 | Fujino et al. | 354/442 |
| 5,164,760 | 11/1992 | Fujino et al. | 354/442 |
| 5,189,466 | 2/1993 | Yasukawa et al. | 354/412 |
| 5,210,569 | 5/1993 | Harada | 354/442 |
| 5,291,236 | 3/1994 | Ohsawa et al. | 354/412 |
| 5,363,169 | 11/1994 | Ishida et al. | 354/442 |
| 5,416,556 | 5/1995 | Suzuki et al. | 354/442 |
| 5,485,242 | 1/1996 | Sato et al. | 354/442 |
| 5,742,853 | * 4/1998 | Haga et al. | 396/292 |
| 5,749,005 | * 5/1998 | Haga et al. | 396/287 |
| 5,761,554 | * 6/1998 | Kirigaya et al. | 396/299 |

* cited by examiner

Primary Examiner—W. B. Perkey (57) ABSTRACT

An exposure compensation device for an automatic exposure camera which is able to easily perform exposure compensation setting regardless of an exposure control mode setting. A first setting unit sets the lens aperture. A second setting means sets the shutter speed of the camera. The camera CPU controls the aperture value and the shutter speed to the appropriate photometric values based on photometric values output by a photometric unit. An exposure compensation amount setting unit changes the shutter speed and the aperture value during picture taking according to an exposure compensation operation. The exposure compensation amount setting unit also sets an exposure compensation amount when exposure is to be compensated. It is possible to set the exposure compensation amount using the second setting unit during an automatic exposure mode in which a first setting mode is given priority. It is possible to set the exposure compensation amount using the first setting unit during the automatic exposure mode in which a second setting mode is given priority.

13 Claims, 10 Drawing Sheets

EXPOSURE COMPENSATION DEVICE FOR AN AUTO EXPOSURE CAMERA

This application is a continuation of U.S. application Ser. No. 08/887,294, filed Jul. 2, 1997, now abandoned, which was a continuation of U.S. application Ser. No. 08/497,083, filed Jun. 30, 1995, now abandoned.

BACKGROUND OF THE INVENTION

1. Field of the Invention

The present invention relates to an exposure compensation device for an auto exposure camera, and in particular, relates to an exposure compensation device which automatically sets the lens aperture and the shutter speed to appropriate values through photometry.

2. Description of the Related Art

The selection of a proper aperture value is important for obtaining satisfactory pictures with an optical camera. Automatic exposure control devices are known for use in optical cameras. In general, known automatic exposure control devices select an appropriate aperture value and a shutter speed using calculations based on a film speed and photometry results.

However, to take pictures at under-exposure or over-exposure conditions, producing a desired result requires a certain degree of freedom. Thus, it is necessary to perform an exposure compensation operation. There are various proposals for methods of setting an exposure compensation amount with respect to an appropriate exposure value, as computed by the camera, using a separate independent exposure compensation device. In general, the known methods are directed toward two specific cases. In the first case, a fixed exposure compensation amount is needed for all pictures taken on a specified film, in the second case, various changes are needed in the calculated exposure compensation amount, such as when calculating the appropriate exposure value is a problem in normal automatic exposure, regardless of the film being used.

Conventional methods of setting an exposure compensation amount allow an exposure compensation amount to be selected by operating an independently attached operation button or rotating a dial on which exposure compensation amounts are identified. In these known methods, not only are special operation buttons necessary, but the operations are complicated and time consuming, which increases the likelihood of missing photo opportunities.

Moreover, there are problems associated with compensating the exposure by a fixed amount for an entire roll of film. For example, even if a picture is taken in which the exposure compensation amount is changed for a single roll, there is a danger that the photographer may forget to cancel the exposure compensation setting for the next roll. In conventional cameras, a display of the exposure compensation amount is only performed as an exposure compensation button is being pushed. Further, known exposure compensation devices typically only display a cryptic mark indicating an exposure compensation operation.

Another problem in setting the exposure compensation amount is that the automatic exposure mode of the camera, for example, a program mode, a shutter priority mode and an aperture priority mode, changes the exposure compensation operating procedure of the camera. That is, it is necessary to consider the exposure compensation operating procedure in the respective automatic exposure modes when setting the exposure compensation amount.

SUMMARY OF THE INVENTION

Accordingly, it is an object of the present invention to provide an inexpensive exposure compensation device for a camera having a plurality of automatic exposure modes that simply and appropriately performs setting of an exposure compensation amount without the need for special setting members.

It is another object of the invention to provide an exposure compensation device for an automatic exposure camera that displays the exposure compensation amount for a specified period when the exposure compensation amount has been set by an exposure information setting unit, such as an aperture value setting unit or a shutter speed setting unit.

Additional objects and advantages of the invention will be set forth in part in the description which follows, and, in part, will be obvious from the description, or may be learned by practice of the invention.

Objects of the present invention are achieved in an exposure compensation device for a camera having an aperture priority mode, the exposure compensation device comprising a first setting unit which sets the lens aperture, a second setting unit which sets a shutter speed, the second setting unit sets an exposure compensation amount when the camera is in the aperture priority mode, a photometric unit which performs photometry and outputs a photometric value, a photographic control unit which controls an aperture value and a shutter speed based on the photometric value, and an exposure compensation amount setting unit that changes one of the shutter speed and the aperture value according to the exposure compensation amount and performs exposure compensation based on the exposure compensation amount when exposure compensation is desired.

Objects of the present invention are also achieved in an exposure compensation device for a camera having a first and a second automatic exposure mode, the exposure compensation device comprising a first setting unit which sets the lens aperture, a second setting unit which sets a shutter speed, the second setting unit setting an exposure compensation amount when the camera is in the first automatic exposure mode, a photometric unit which performs photometry and outputs a photometric value, a photographic control unit which controls an aperture value and a shutter speed based on the photometric value, and an exposure compensation amount setting unit that changes one of the shutter speed and the aperture value according to the exposure compensation amount and performs exposure compensation based on the exposure compensation amount when exposure compensation is desired.

Objects of the present invention are further achieved in an input device for inputting different types of data into a camera, the input device comprising a setting dial for setting data, and at least one button for changing the type of data set by the setting dial.

Objects of the present invention are also achieved in an exposure compensation device for an automatic exposure camera equipped with a first setting unit for setting the lens aperture, a second setting unit for setting the camera's shutter speed, a photometric unit, a photographic control unit for controlling the aperture value and the shutter speed based on a photometric value obtained through the photometric unit, and an exposure compensation amount setting unit for changing the shutter speed or the aperture value during picture taking according to the exposure compensation operation and setting the exposure compensation amount when exposure is to be compensated.

Objects of the present invention are also achieved in an exposure compensation device for an automatic exposure camera that sets the exposure compensation amount with a shutter speed setting dial during the automatic exposure mode in which an aperture priority mode is given priority, or which sets the exposure compensation amount with an aperture value setting member during the automatic exposure mode in which a shutter speed priority mode is given priority.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
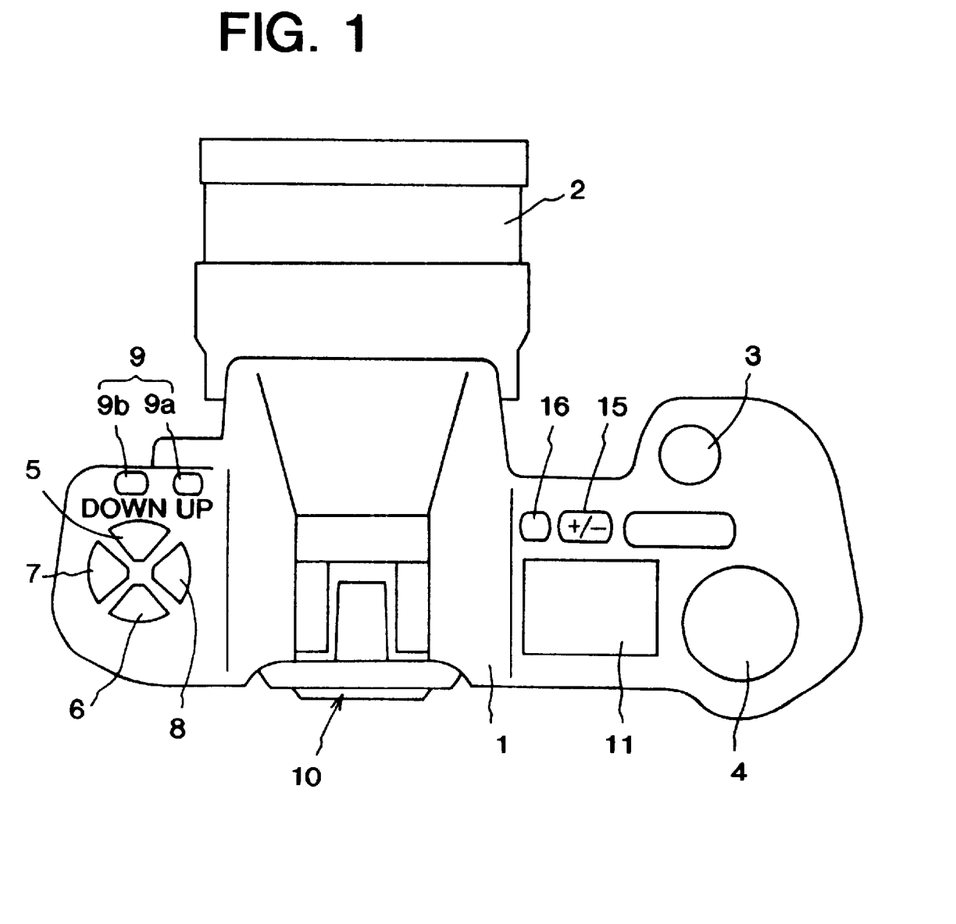
FIG. 1 is a top view of a camera body provided with an exposure compensation device in accordance with a preferred embodiment of the present invention.

FIG. 1 is a top view of a camera body provided with an exposure compensation device in accordance with a preferred embodiment of the present invention. A lens barrel 2 holds a photographic optical system (not shown). The lens barrel 2 attaches to the center of the front side of a camera body 1. A release button 3, a rotary setting dial 4 (also referred to as a command dial), and setting buttons 5~9, are positioned on top of the camera body. The setting buttons 5~9 (the setting button 9 comprises buttons 9a and 9b) set various types of information, as discussed hereinafter. An in-viewfinder display 10 is positioned at the upper part of the rear side of the camera body 1. An external display 11 is positioned on one side of the top of the camera body 1. A compensation button 15, for exposure compensation, and a rewind button 16, used during film rewinding, are positioned adjacent to the external display 11.

The setting button 5 is an operation button for switching the automatic exposure control mode. The automatic exposure control mode may be switched between a program mode, a shutter speed priority mode, an aperture priority mode, and a manual mode by rotating the setting dial 4 while pressing the setting button 5.

The setting button 6 is an operation button for switching the drive (feed) mode. The drive mode may be switched between a continuous shooting mode and a single shot mode by rotating the setting dial 4 while pressing the setting button 6.

The setting button 7 is an operation button for switching the film speed. The film speed is changed by rotating the setting dial 4 while the setting button 7 is pressed.

The setting button 8 is an operation button for performing synchro mode setting. The synchro mode setting is changed by rotating the setting dial 4 while pressing the setting button 8.

The setting buttons 9a and 9b are preferably buttons for setting the aperture value of the lens. The aperture value is changed each time one of the buttons 9a and 9b, on which "UP" and "DOWN" are respectively written, are pressed.

The in-viewfinder display 10 displays information such as the shutter speed, aperture, number of frames shot, and focusing information. Preferably, the in-viewfinder display 10 comprises a liquid crystal display (LCD). The external display 11 displays information such as the shutter speed, aperture, the number of frames taken and film speed The external display 11 preferably comprises a liquid crystal display (LCD).

The exposure compensation button 15 sets an exposure compensation amount. The exposure compensation amount is display in the external display 11 and the in-viewfinder display 10. Each displayed exposure compensation amount is changed when the setting dial 4 is rotated while the compensation button 15 is pressed. When the compensation button 15 is returned to its origin, the exposure compensation amount display goes out, and a compensation mark lights.

The rewind button 16 performs the film rewind operation. When the rewind button 16 is pressed, the film is rewound. When the film is fully rewound, rewinding is stopped by a film detection switch (not shown).

Figure 2A:
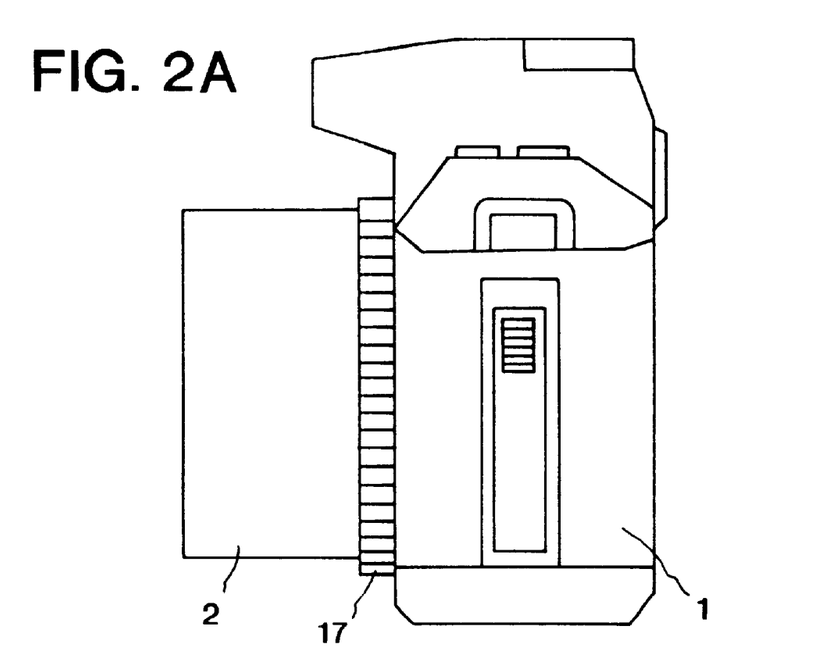
FIG. 2A is a side view of a camera body provided with an exposure compensation device in accordance with a preferred embodiment of the present invention.

FIG. 2A is a side view of a camera body provided with an exposure compensation device in accordance with a preferred embodiment of the present invention. The aperture value of the lens barrel 2 is transmitted to the camera body 1 by rotating the lens aperture ring 17.

Figure 2B:
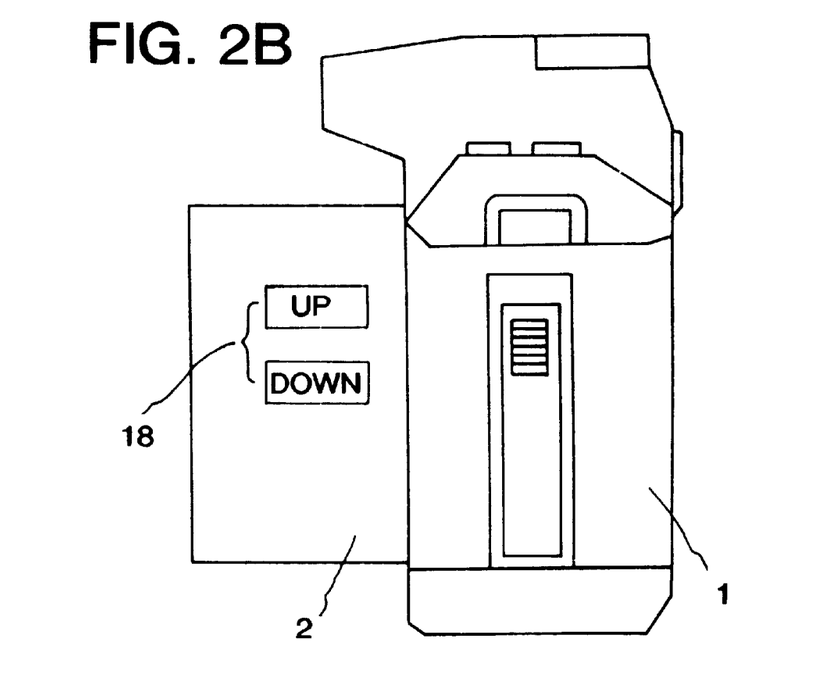
FIG. 2B is a side view of a camera body provided with an exposure compensation device in accordance with a preferred embodiment of the present invention.

FIG. 2B is a side view of a camera body provided with an exposure compensation device in accordance with a preferred embodiment of the present invention. As an alternative to the use of a ring 17, a pair of operating buttons 18 can be employed to transmit electrical signals, similar to the buttons 9a and 9b (not shown) to the body 1. The button 9a and 9b may then be provided with other functions, for example, they may be used for switching the photographic mode when the automatic exposure control mode is the program mode, or they may be configured in such a way that a photographic control mode (such as sports, portrait, continuous shooting) is switched by rotating the setting dial 4 while pressing the setting buttons 9.

In the preferred embodiment, the lens barrel 2 has a structure which allows it to be removed from the camera body 1, and two operation buttons 18, which change the aperture value (see FIG. 2B), or a device which uses an aperture ring 17, which mechanically transmits the aperture value to the camera body 1 (See FIG. 2A).

Figure 3:
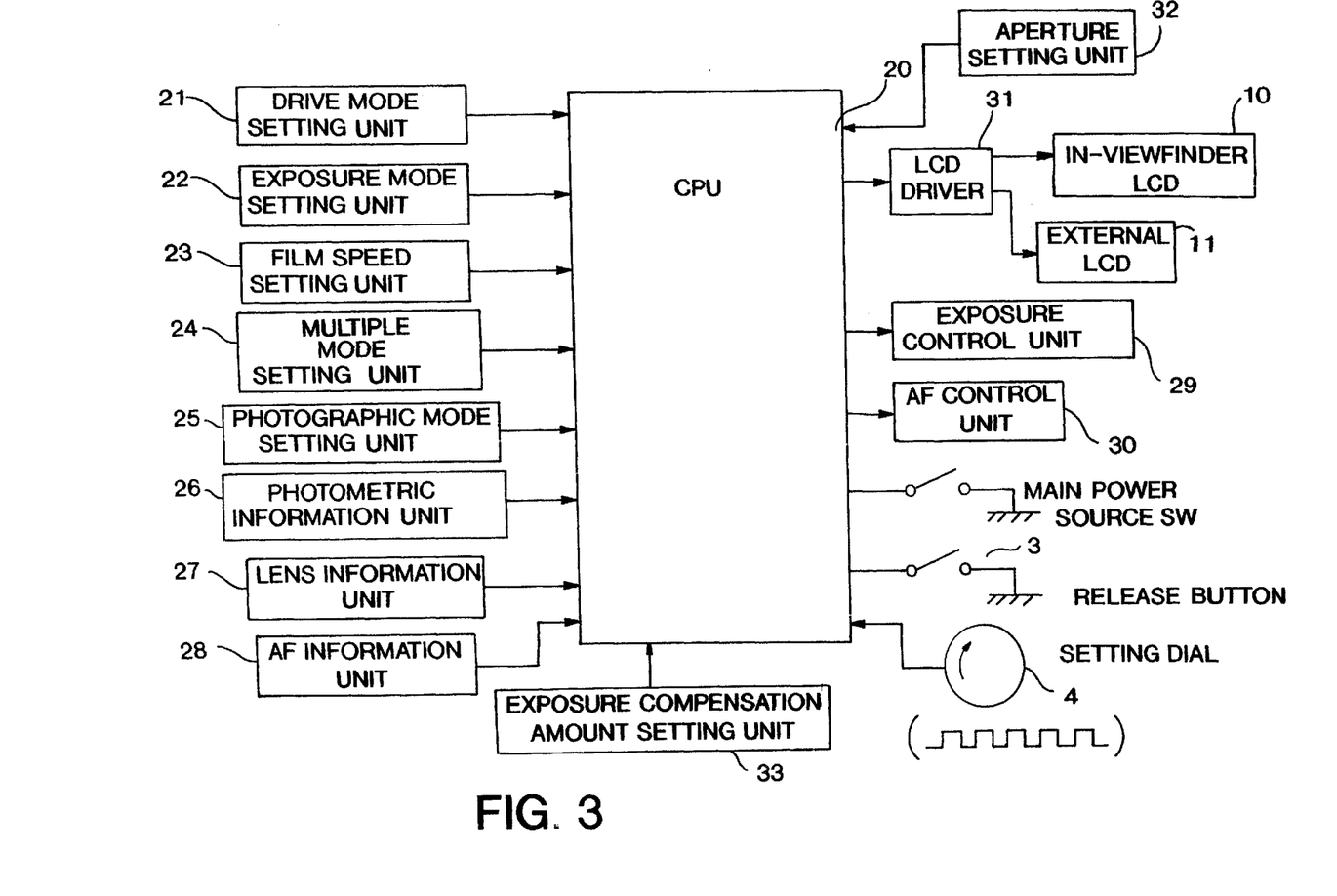
FIG. 3 is a block diagram of a control circuit provided with an exposure compensation device in accordance with a preferred embodiment of the present invention.

FIG. 3 is a block diagram of a control circuit provided with an exposure compensation device in accordance with a preferred embodiment of the present invention. The control circuit generally comprises a CPU 20 to which are connected various setting units. A drive mode setting unit 21 sends information regarding the drive mode to the CPU 20.

An exposure mode setting unit 22 sends information regarding the exposure mode to the CPU 20. A film speed setting unit 23 sends information regarding the shutter speed to the CPU 20. A multiple mode setting unit 24 sends information regarding the multiple mode to the CPU 20. A photographic mode setting unit 25 sends information regarding the photographic mode to the CPU 20. Information regarding the drive mode, exposure control mode, film speed, multiple mode, and photographic mode information are set by rotating the setting dial 4 while pressing setting buttons 5–8.

A photometric information unit 26, measures a subject brightness using a photoreceptor element, such as a silicon photo diode (SPD). The output of the photoreceptor element is converted to a digital signal and inputted to the CPU 20. A lens information unit 27 receives the focal length of the lens 2, the release aperture value, and the minimum aperture value, from the photographic lens 2, and inputs these values to the CPU 20. An autofocus (AF) information unit 28 receives information relating to focusing and inputs such information to the CPU 20. An exposure control unit 29 performs aperture control based on a command from the CPU 20. The exposure control unit 29 also performs running control of a shutter (not shown).

An AF control unit 30 drives the lens barrel 2 with a motor (not shown), based on a command from the CPU 20, to guide the lens barrel 2 into an in-focus position. An exposure compensation amount setting unit 33 receives an exposure compensation amount when the setting dial 4 is turned while the setting button 15, also referred to as an "exposure compensation button", is pressed. Preferably, when the exposure mode is shutter priority mode or manual mode, the setting dial 4 may be rotated to change the shutter speed. The operation buttons 9a and 9b form an aperture setting unit 32. If the button 9a (UP) is pressed in the aperture priority mode, the set aperture value is released. If the button 9b (DOWN) is pressed, the set aperture value is stopped down.

An LCD driver 31 drives the in-viewfinder Display 10 or the external display 11 according to display information from the CPU 20.

A main power source switch SW is provided asan on/off switch.

Figure 4A:
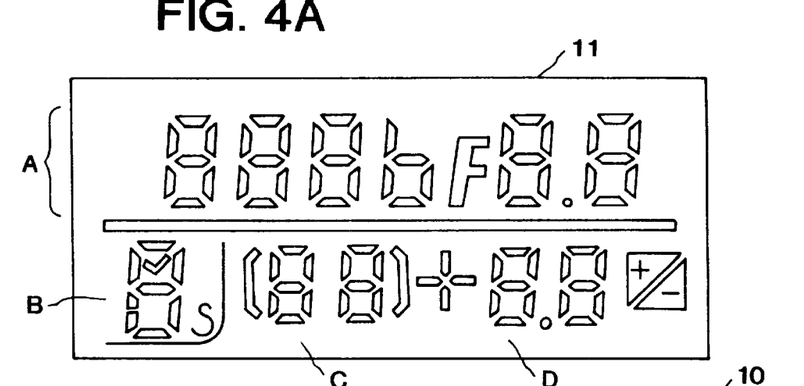
FIG. 4A is a diagram of a fully lit external display in an exposure compensation device in accordance with a preferred embodiment of the present invention.

FIG. 4A is a diagram of a fully lit external display 11 in an exposure compensation device in accordance with a preferred embodiment of the present invention. A display unit A displays the shutter speed and aperture value. A display unit B displays the exposure control mode. A display unit C displays the number of frames taken and the photographic control mode. A display unit D displays an exposure compensation value and an exposure compensation mark "±".

Figure 4B:
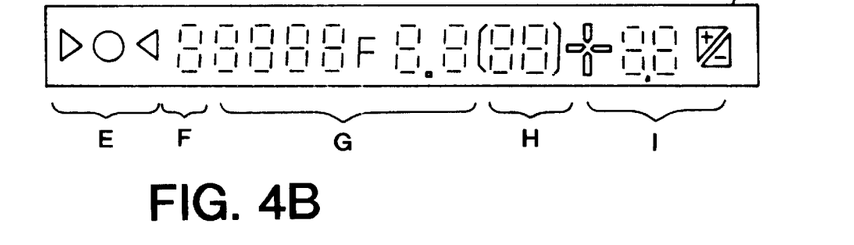
FIG. 4B is a diagram of a fully lit in-viewfinder display in an exposure compensation device in accordance with a preferred embodiment of the present invention.

FIG. 4B is a diagram of a fully lit in-viewfinder display 10 in an exposure compensation device in accordance with a preferred embodiment of the present invention. A display unit E is the display unit for AF focusing information. A display unit F displays the exposure control mode. A display unit G displays the shutter speed and aperture. A display unit H displays the number of frames taken and the photographic control mode. A display unit I displays the exposure compensation value and the exposure compensation mark.

Figure 5A:
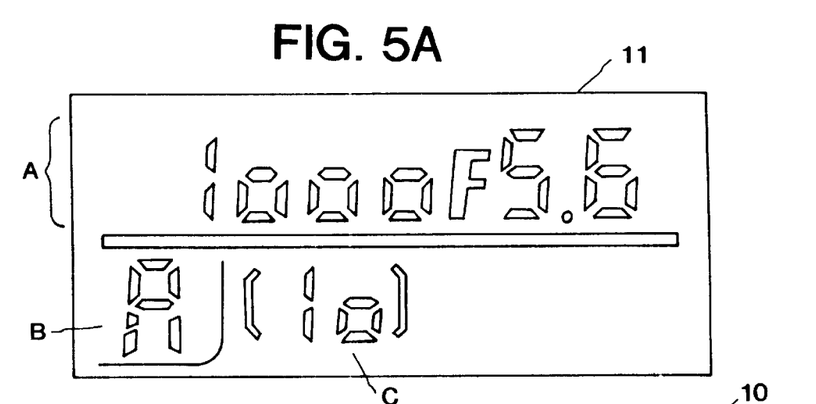
FIG. 5A is a diagram of a partially lit external display, when the automatic exposure mode is the aperture priority mode and exposure compensation is not being performed, in an exposure compensation device in accordance with a preferred embodiment of the present invention.

FIG. 5A is a diagram of a partially lit external display 11, when the automatic exposure mode is the aperture priority mode and exposure compensation is not being performed, in an exposure compensation device in accordance with a preferred embodiment of the present invention. The external display shows that the shutter speed is $\frac{1}{1000}$, the aperture value is F5.6, the automatic exposure control mode is the aperture priority mode "A," and the number of frames taken is 10. In the display unit D, the exposure compensation amount is not set.

Figure 5B:
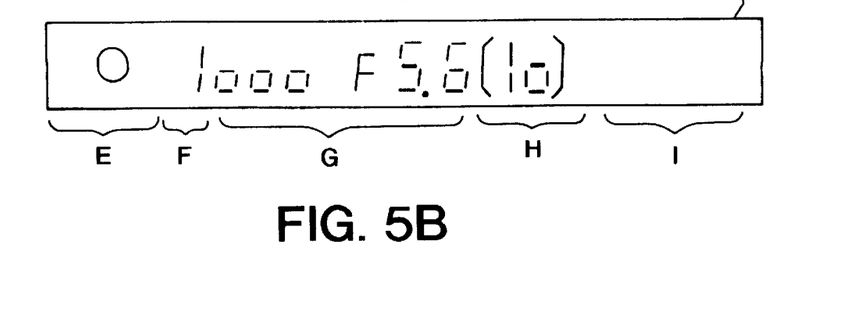
FIG. 5B is a diagram of a partially lit in-viewfinder display, when the automatic exposure mode is the aperture priority mode and exposure compensation is not being performed, in an exposure compensation device in accordance with a preferred embodiment of the present invention.

FIG. 5B is a diagram of a partially lit in-viewfinder display 10, when the automatic exposure mode is the aperture priority mode and exposure compensation is not being performed, in an exposure compensation device in accordance with a preferred embodiment of the present invention. In general, the in-viewfinder display 10 displays the same information as the external display 11.

Figure 6A:
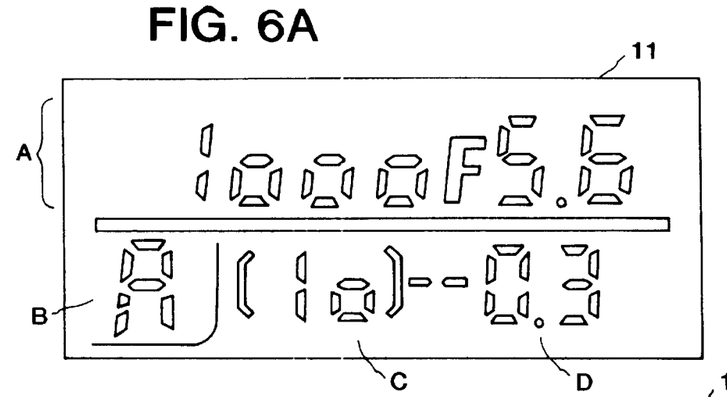
FIG. 6A is a diagram of a partially lit external display, when the automatic exposure mode is the aperture priority mode and exposure compensation is being performed, in an exposure compensation device in accordance with a preferred embodiment of the present invention.
Figure 6B:
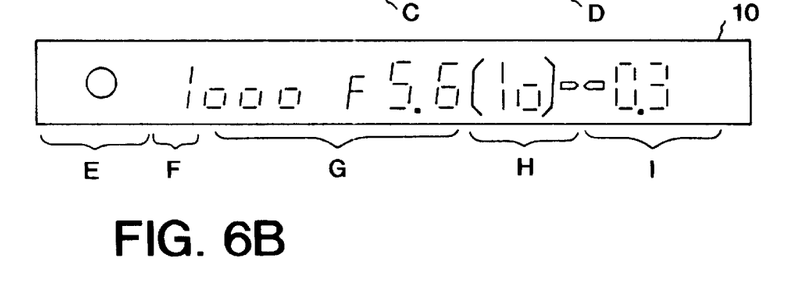
FIG. 6B is a diagram of a partially lit in-viewfinder display, when the automatic exposure mode is the aperture priority mode and exposure compensation is being performed, in an exposure compensation device in accordance with a preferred embodiment of the present invention.

FIG. 6A is a diagram of a partially lit external display 11, when the automatic exposure mode is aperture priority mode and exposure compensation is being performed, in an exposure compensation device in accordance with a preferred embodiment of the present invention. FIG. 6B is a diagram of a partially lit in-viewfinder display 10, when the automatic exposure mode is the aperture priority mode and exposure compensation is being performed, in an exposure compensation device in accordance with a preferred embodiment of the present invention. In known cameras, in the aperture priority mode, the shutter speed setting dial did not function, and the display did not change, even if the shutter speed dial was rotated. In contrast to this, with the above embodiment of the present invention, rotating the setting dial 4 sets and causes the display of the exposure compensation amount. In FIG. 6A, the external display 11 is showing an exposure compensation of "–0.3" in the display unit 3. When a photograph is taken, the exposure will be adjusted by –0.3 EV. When the setting dial 4 is rotated the adjustment is changed, for example from –0.3 EV to –0.7 EV or –1.0. Preferably, after the expiration of a half press timer (not shown, but initiated upon the half press of the shutter release button 3), the exposure compensation amount setting is canceled, and the exposure compensation amount becomes 0. Thereafter, there is a return to the display as shown in FIG. 5A, after another half press. Thus, exposure compensation is canceled after the completion of picture taking, and there is no hinderance to subsequent picture taking. However, the exposure compensation amount set by the compensation button 15 is not canceled. A value which is totalled with the amount set by the exposure compensation button 15 is displayed, so it is not necessary to calculate the exposure values one by one. In such a case, the value set by the exposure compensation button 15 remains after a fixed period of time (that is, after the half-press timer has expired), so the exposure compensation mark "+/–" lights.

The above is an example where exposure compensation is performed using the setting dial 4 during the aperture priority mode, but this exposure compensation is also possible during other modes, for example the shutter priority mode and the program mode.

Figure 7A:
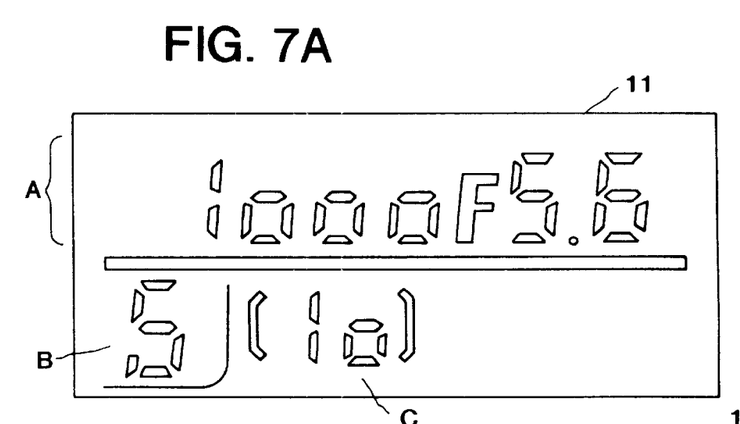
FIG. 7A is a diagram of a partially lit external display, when the automatic exposure mode is the shutter priority mode and exposure compensation is not being performed, in an exposure compensation device in accordance with a preferred embodiment of the present invention.
Figure 7B:
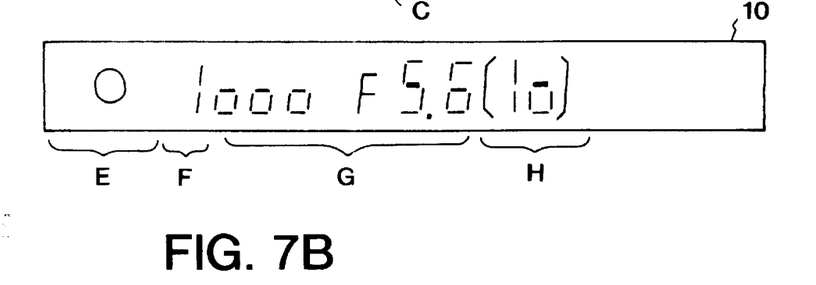
FIG. 7B is a diagram of a partially lit in-viewfinder display, when the automatic exposure mode is the shutter priority mode and exposure compensation is not being performed, in an exposure compensation device in accordance with a preferred embodiment of the present invention.

FIG. 7A is a diagram of a partially lit external display 11, when the automatic exposure mode is the shutter priority mode and exposure compensation is not being performed, in an exposure compensation device in accordance with a preferred embodiment of the present invention. FIG. 7B is a diagram of a partially lit in-viewfinder display 10, when the automatic exposure made is the shutter priority mode and exposure compensation is not being performed, in an exposure compensation device in accordance with a preferred embodiment of the present invention. The displays are similar to the displays in the aperture priority mode except that the shutter priority mode display "S" is displayed. During the shutter priority mode, the shutter speed changes when the setting dial 4 is rotated. In known automatic exposure cameras, the display did not change even if the aperture setting buttons 9 or the switches 18 on the side of the lens barrel 2 or the aperture ring 17 for aperture transmission were changed. In contrast, the above embodiment of the present invention allows exposure compensation even in the shutter priority mode.

Figure 8A:
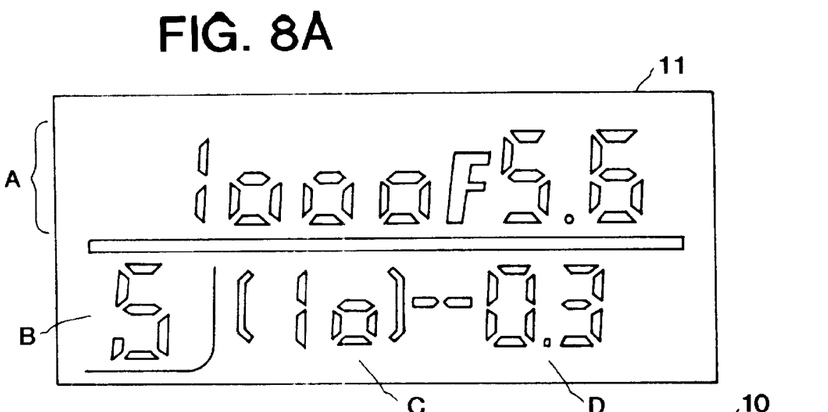
FIG. 8A is a diagram of a partially lit external display, when the automatic exposure mode is the shutter priority mode and exposure compensation is being performed, in an exposure compensation device in accordance with a preferred embodiment of the present invention.
Figure 8B:
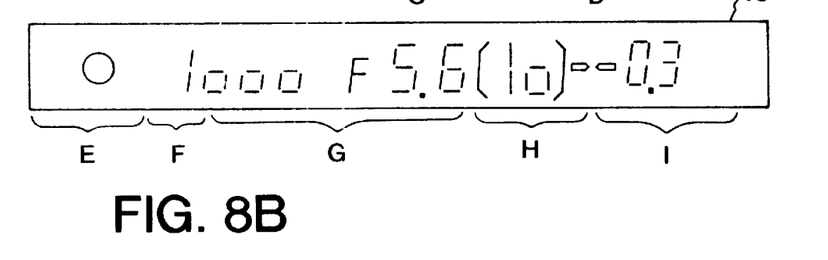
FIG. 8B is a diagram of a partially lit in-viewfinder display, when the automatic exposure mode is the shutter priority mode and exposure compensation is being performed, in an exposure compensation device in accordance with a preferred embodiment of the present invention.

FIG. 8A is a diagram of a partially lit external display 11, when the automatic exposure mode is the shutter priority mode and exposure compensation is being performed, in an exposure compensation device in accordance with a preferred embodiment of the present invention. FIG. 8B is a diagram of a partially lit in-viewfinder display 10, when the automatic exposure mode is the shutter priority mode and exposure compensation is being performed, in an exposure compensation device in accordance with a preferred embodiment of the present invention. The displays are showing an exposure compensation of "–0.3" in the display unit 3. When a photograph is taken, the exposure will be adjusted by –0.3 EV.

Figure 9A:
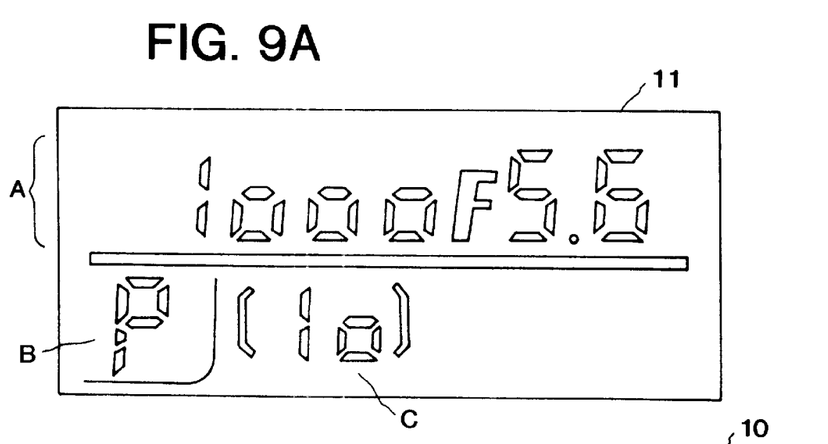
FIG. 9A is a diagram of a partially lit external display, when the automatic exposure mode is the program mode and exposure compensation is not being performed, in an exposure compensation device in accordance with a preferred embodiment of the present invention.
Figure 9B:
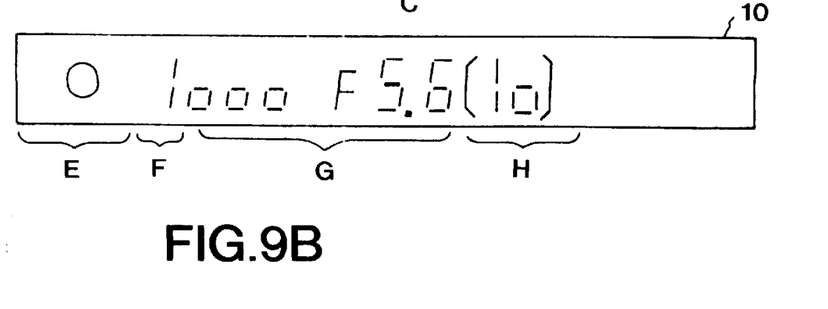
FIG. 9B is a diagram of a partially lit in-viewfinder display, when the automatic exposure mode is the program mode and exposure compensation is not being performed, in an exposure compensation device in accordance with a preferred embodiment of the present invention.

FIG. 9A is a diagram of a partially lit external display 11, when the automatic exposure mode is the program mode and exposure compensation is not being performed, in an exposure compensation device in accordance with a preferred embodiment of the present invention. FIG. 9B is a diagram of a partially lit in-viewfinder display 11, when the automatic exposure mode is the program mode and exposure compensation is not being performed, in an exposure compensation device in accordance with a preferred embodiment of the present invention. The displays are similar to the displays during the aperture priority mode, shown in FIGS. 5A and 5B, except that the program mode "P" is displayed, so a detailed explanation has been omitted.

Figure 10A:
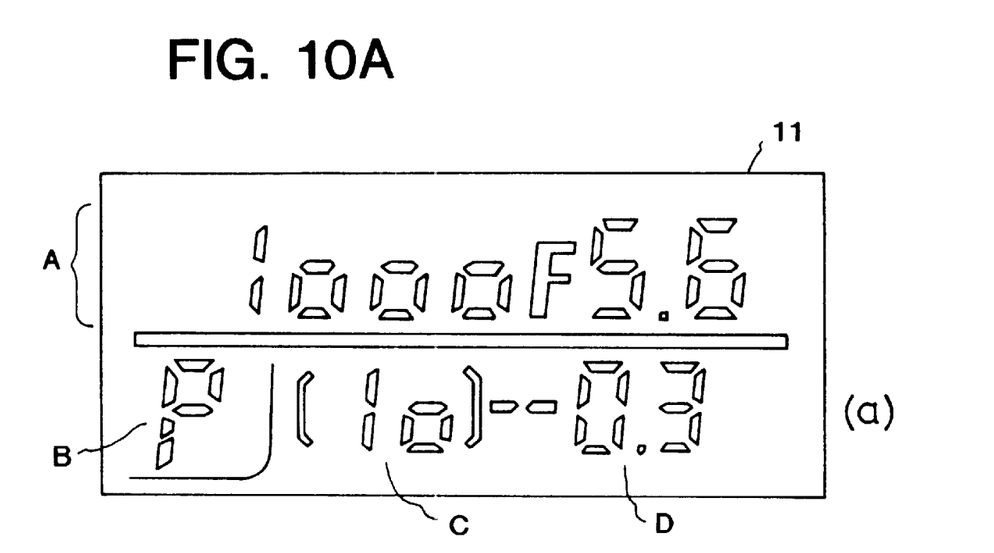
FIG. 10A is a diagram of a partially lit external display, when the exposure mode is the program mode and exposure compensation is being performed, in an automatic exposure compensation device in accordance with a preferred embodiment of the present invention.
Figure 10B:
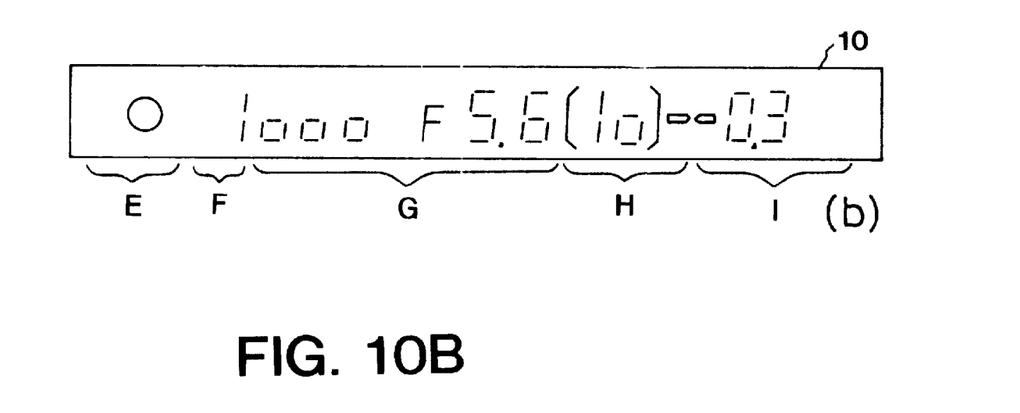
FIG. 10B is a diagram of a partially lit in-viewfinder display, when the exposure mode is the program mode and exposure compensation is being performed, in an automatic exposure compensation device in accordance with a preferred embodiment of the present invention.

FIG. 10A is a diagram of a partially lit external display 11, when the automatic exposure mode is the program mode and exposure compensation is being performed, in an exposure compensation device in accordance with a preferred embodiment of the present invention. FIG. 10B is a diagram of a partially lit in-viewfinder display 10, when the automatic exposure mode is the program mode and exposure compensation is being performed, in an exposure compensation device in accordance with a preferred embodiment of the present invention. The displays show the case where the aperture setting switch has been operated or the setting dial 4 has been operated to perform exposure compensation.

Figure 11:
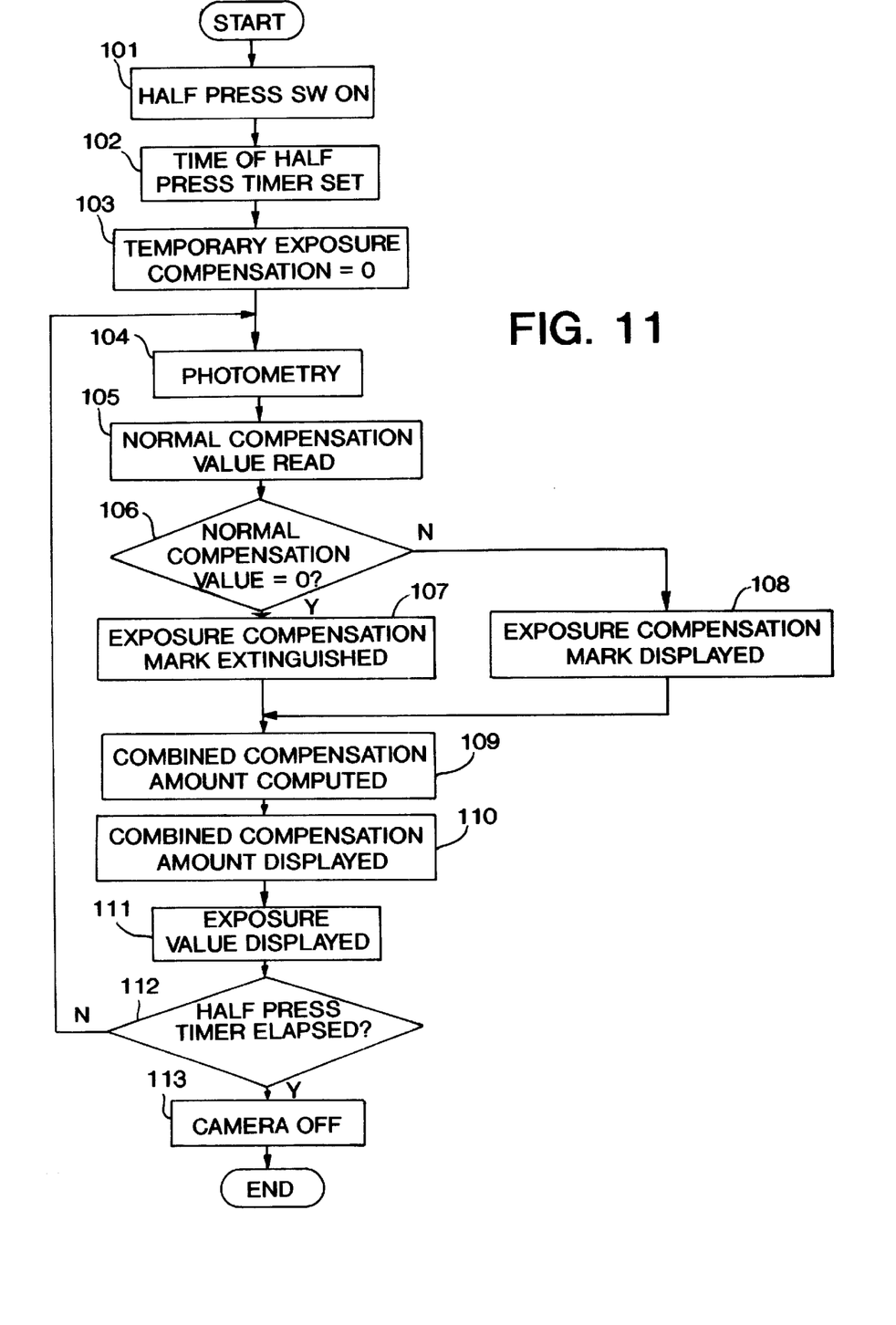
FIG. 11 is a flow chart which shows the main routine in the photographic operating system of the camera's CPU.

FIG. 11 is a flow chart which shows the main routine in the photographic operating system of the camera's CPU. First, in step (hereunder abbreviated as "S") 101, when the release button 3 of the camera is lightly pressed, that is, when the half-press operation is performed, the main power source switch of the camera comes ON. Then, in S102, the time during which the main power source switch SW of the camera will remain ON is set. In S103, the exposure compensation amount is temporarily set to "0". This causes the temporary exposure compensation amount setting to be canceled at camera start-up.

In S104, photometry is performed by the photoreceptor element. In S105, a normal exposure compensation amount, which has been set by the exposure compensation button 15 and the setting dial 4, is read from the memory. Then, in S106, a determination is made as to whether the normal exposure compensation amount is "0", If the normal exposure compensation amount is "0", the exposure compensation mark is extinguished in S107. If the normal exposure compensation amount is not "0", the exposure compensation mark is displayed in S108.

In S109, the temporary exposure compensation amount and the exposure compensation amount which was set by the exposure compensation button 15 are summed. Then, in S110, the total exposure compensation amount is displayed.

In S1, the shutter speed and the aperture value, which are the exposure values based the photometric value obtained in S104 and the exposure compensation value obtained in Si 101 are displayed. More specifically, the exposure modes, which are exposure values determined by the setting statuses, i.e., aperture priority auto (A), shutter priority auto (S), program auto (P), and manual (M), are displayed.

Then, in S112, a determination is made as to whether the half-press timer has elapsed. If the half press timer has not elapsed, there is a return to S104. If the half press timer has elapsed, operation proceeds to Si 13, and the camera's main power source switch SW is turned OFF.

Figure 12:
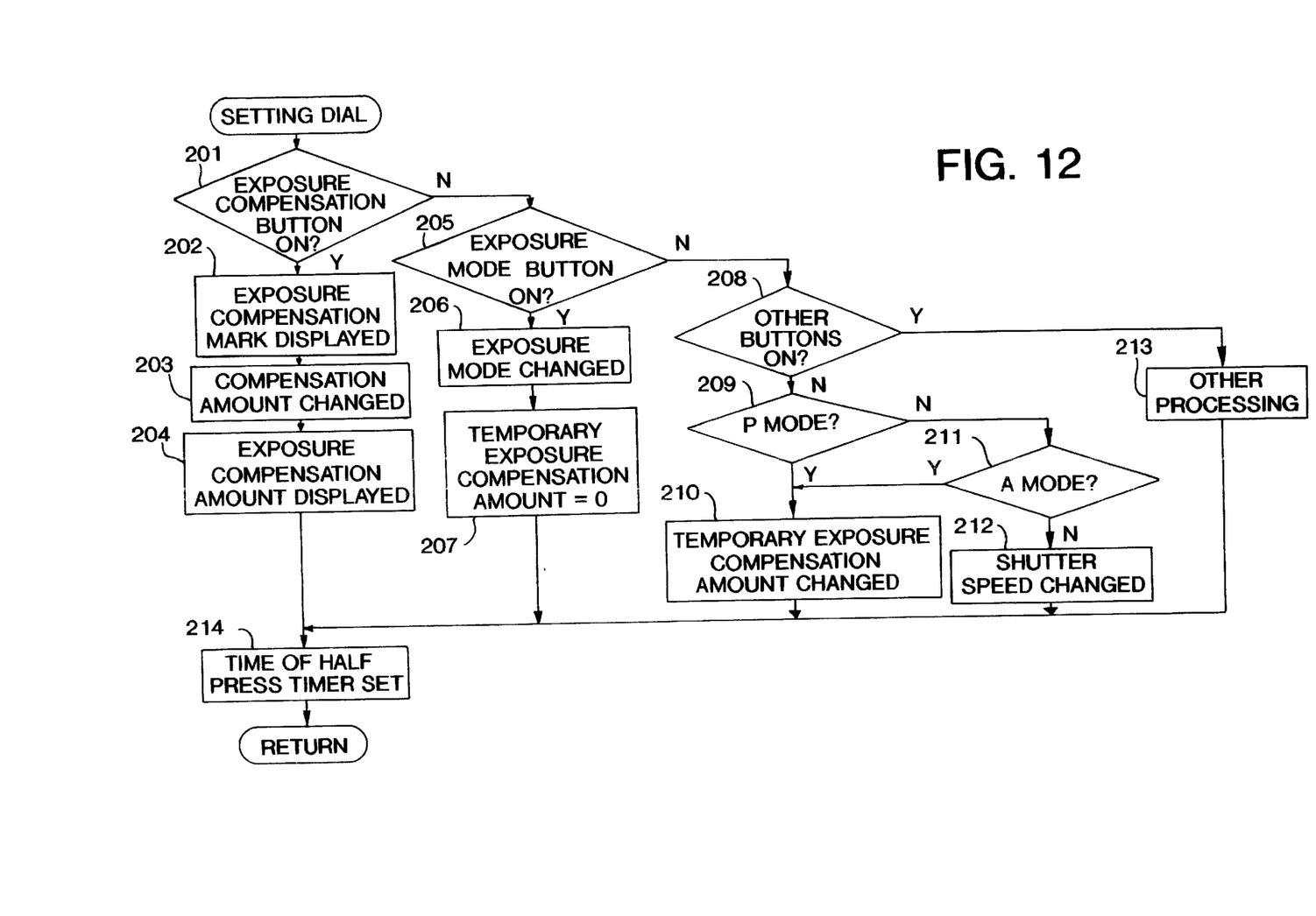
FIG. 12 is a flow chart which shows the subroutine when the setting dial of the camera has been operated.

FIG. 12 is a flow chart which shows the subroutine when the setting dial 4 of the camera has been operated. In general, when the setting dial 4 is operated, there is a temporary departure from the main routine, as shown in FIG. 11, with a return to the main routine after processing is completed. In S201, when the setting dial 4 has been operated, a determination is made as to whether the exposure compensation button 15 has been pressed. If the exposure compensation button 15 has been pressed, operation proceeds to S202. If the exposure compensation button 15 has not been pressed, operation proceeds to S205.

In S202, the exposure compensation mark is lit. This indicates that the exposure compensation operation is being performed. In S203, the currently set exposure compensation amount is increased or decreased according to the direction and amount of rotation of the setting dial 4. Then, in S204, the new exposure compensation amount is displayed, and after an appropriate amount of time, operation proceeds to S214.

In S205, a determination is made as to whether the exposure control mode button 5 is pressed while the setting dial 4 is being operated. If the exposure control mode button 5 has been pressed, operation proceeds to S206. If the exposure control mode button 5 has been not been pressed, operation proceeds to S208.

In S206, the exposure mode is changed. In S207, the temporary exposure compensation amount is set to "0" and operation proceeds to S214.

In S208, a determination is made as to whether other buttons, for example, the film speed setting button 7 have been pressed. If the other buttons have not been pressed, it is judged that an independent operation of the setting dial 4 has been performed, and operation proceeds to S209. If other button have been pressed, operation proceeds to S212.

In S209, a determination is made as to whether the current exposure mode is the program "P" mode. If the current exposure mode is the "P" mode, operation proceeds to S210. If the current exposure mode is not the "P" mode, operation proceeds to S211. In S211, a determination is made as to whether the exposure mode is the automatic exposure "A" mode. If the exposure mode is the "A" mode, operation proceeds to S210. If the exposure mode is not the "A" mode, operation proceeds to S212. Temporary exposure compensation is performed in S210. The shutter speed is changed in S212. In either case, operation proceeds to S214.

In S213, processing is performed when the setting dial 4 has been operated in a manner other than in conjunction with the exposure compensation button 15 or the exposure control mode button 5. For example, setting the film speed or the setting of synchro mode. Operation proceeds to S214 after the necessary processing is performed.

In S214, the time of the half-press timer is reset. This is to extend the half-press timer of the camera after some type of operation has been performed. Then, when this is complete, there is a return to the main routine.

Figure 13:
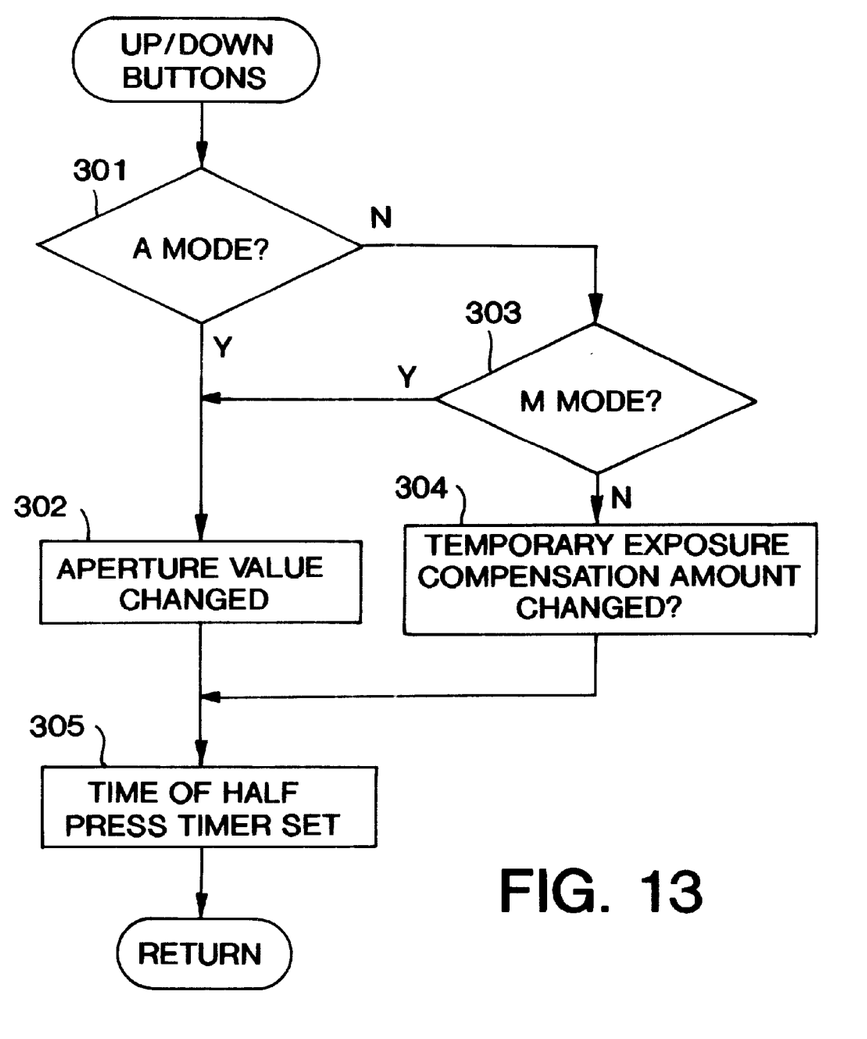
FIG. 13 is a flow chart which shows the subroutine when the up/down buttons of the camera have been operated.

FIG. 13 is a flow chart which shows the subroutine when the up/down buttons, i.e. setting buttons 9a and 9b, of the camera have been operated. In S301, a determination is made as to whether the exposure mode is "A". If the exposure mode is "A," operation proceeds to S302. If the exposure mode is not "A", operation proceeds to S303.

In S303, a determination is made as to whether the exposure mode is manual "M." If the exposure mode is "M," operation proceeds to S302. If the exposure mode is not "M", operation proceeds to S304. In step S302, the aperture value is changed.

In step S304, temporary exposure compensation is performed. In either case operation proceeds to S305.

In S305, the time of the half-press timer is reset. This is to extend the half-press. timer of the camera after some type of operation has been performed. Then, when this is complete, there is a return to the main routine.

In S109 in FIG. 11, the temporary exposure compensation amounts, which have been set in S212 in FIG. 12 and S304 in FIG. 13, are added to the normal exposure compensation amount, which was set in S203 in FIG. 12.

In an exposure compensation device for an automatic exposure camera in accordance with the preferred embodiment of the present invention, when in the aperture priority mode, setting of the exposure compensation amount is possible with the shutter speed setting dial, i.e. the setting dial 4. In the shutter priority mode, setting of the exposure compensation amount is possible with the aperture value setting member, i.e. the setting button 9a and 9b. In the program mode, in which neither the aperture priority mode nor the shutter priority mode is given priority, the setting dial 4 or the setting button 9a and 9b are able to set the exposure compensation amount.

In accordance with the first preferred embodiment of the present invention, it is possible to easily set the exposure compensation amount using a member which is located in a position where it is be easy to operate. Moreover, after a series of pictures has been taken, the exposure compensation amount is canceled after a specified period of time has elapsed. Also, the compensation amount is canceled when the exposure mode is changed. Further, in accordance with the preferred embodiment of the present invention, a special exposure compensation button is not needed. Further, it is possible to always display the exposure compensation amount for a specified period of time has elapsed.

Although the first embodiment of the present invention has been described with respect to a specific configuration, it will be recognized that the first embodiment is not limited to the specific configuration. For example, a specific overall configuration of the automatic exposure camera relating to the present invention has been omitted, but the present invention can be employed effectively in various cameras, provided they are suitable for automatic exposure.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An exposure compensation device for a camera having an aperture priority mode and a shutter priority mode, the exposure compensation device comprising:

a first setting device which sets a lens aperture, and sets a temporary exposure compensation amount when the camera is in the shutter priority mode;

a second setting device which sets a shutter speed, and sets the temporary exposure compensation amount when the camera is in the aperture priority mode;

a photometric device which performs photometry and outputs a photometric value;

a photographic control device which controls an aperture value and a shutter speed based on the photometric value; and an exposure compensation amount setting device to change at least one of the shutter speed and the aperture value according to the temporary exposure compensation amount and to perform exposure compensation based on the temporary exposure compensation amount when exposure compensation is desired and to reset the temporary exposure compensation amount to zero in response to a predetermined condition.

2. An exposure compensation device, as set forth in claim 1, wherein the exposure compensation amount is canceled when the camera is turned off.

3. An exposure compensation device, as set forth in claim 2, wherein the camera automatically turns off after a preset amount of time has elapsed.

4. An exposure compensation device, as set forth in claim 2, wherein the exposure compensation amount is canceled after a preset amount of time has elapsed.

5. An exposure compensation device, as set forth in claim 1, wherein the exposure compensation amount is displayed until the predetermined condition occurs.

6. An exposure compensation device, as set forth in claim 1, wherein an additional exposure compensation amount is added to the temporary exposure compensation amount to produce a total exposure compensation amount and said exposure compensation amount seting unit changes at least one of the shutter speed and the aperture value according to the total exposure compensation amount.

7. An exposure compensation device, as set forth in claim 6, further comprising:

a memory to save the additional exposure compensation amount even if the camera is turned off.

8. An exposure compensation device, as set forth in claim 1, wherein the exposure compensation amount is canceled by changing the mode of the camera.

9. An exposure compensation device for a camera having a first and a second automatic exposure mode, the exposure compensation device comprising:

a first setting device which sets a lens aperture, wherein the first setting device sets a temporary exposure compensation amount when the camera is in the second automatic exposure mode;

a second setting device which sets a shutter speed, wherein the second setting device sets the temporary exposure compensation amount when the camera is in the first automatic exposure mode;

a photometric device which performs photometry and outputs a photometric value;

a photographic control device which controls an aperture value and a shutter speed based on the photometric value; and an exposure compensation amount setting device that changes at least one of the shutter speed and the aperture value according to the temporary exposure compensation amount and performs exposure compensation based on the temporary exposure compensation amount when exposure compensation is desired and resets the temporary exposure compensation amount to zero in response to a predetermined condition.

10. An exposure compensation device, as set forth in claim 9, wherein the camera has a third automatic exposure mode and at least one of the first setting unit and the second setting unit sets the temporary exposure compensation amount when the camera is in the third automatic exposure mode.

11. An exposure compensation device for a camera having an aperture priority mode and a shutter priority mode, the exposure compensation device comprising:

a first setting device which sets the lens aperture, and which sets an exposure compensation amount when the camera is in the shutter priority mode;

a second setting device which sets a shutter speed, and which sets the exposure compensation amount when the camera is in the aperture priority mode;

a photometric device which performs photometry and outputs a photometric value;

a photographic control device which controls an aperture value and a shutter speed based on the photometric value; and an exposure compensation amount setting device that changes one of the shutter speed and the aperture value according to the exposure compensation amount and performs exposure compensation based on the exposure compensation amount when exposure compensation is desired, the exposure compensation amount being cancelled when the camera is turned off or when the mode is changed.

12. An exposure compensation device for a camera having a first and a second automatic exposure mode, the exposure compensation device comprising:

a first setting device which sets a lens aperture, and which sets an exposure compensation amount when the camera is in the second automatic exposure mode;

a second setting device which sets a shutter speed, and which sets the exposure compensation amount when the camera is in the first automatic exposure mode;

a photometric device which performs photometry and outputs a photometric value;

a photographic control device which controls an aperture value and a shutter speed based on the photometric value; and an exposure compensation amount setting device that changes one of the shutter speed and the aperture value according to the exposure compensation amount and performs exposure compensation based on the exposure compensation amount when exposure compensation is desired, the exposure compensation amount being cancelled when the camera is turned off or when the automatic exposure mode is changed.

13. An exposure compensation device for a camera comprising:

a setting device which adjusts an operating parameter of the camera while the camera is in a first exposure mode and sets an exposure compensation value when the camera is in a second exposure mode, the exposure compensation value being cancelled in response to one of a power supply of the camera being turned off, all respective changes in the exposure mode, and a shutter button being half depressed for a predetermined time; and an exposure compensation amount setting device that performs exposure compensation based on the exposure compensation value.

* * * * *